W. L. GILMORE.
AIRPLANE FUSELAGE.
APPLICATION FILED JUNE 11, 1919.
1,368,428.
Patented Feb. 15, 1921.
2 SHEETS—SHEET 1.
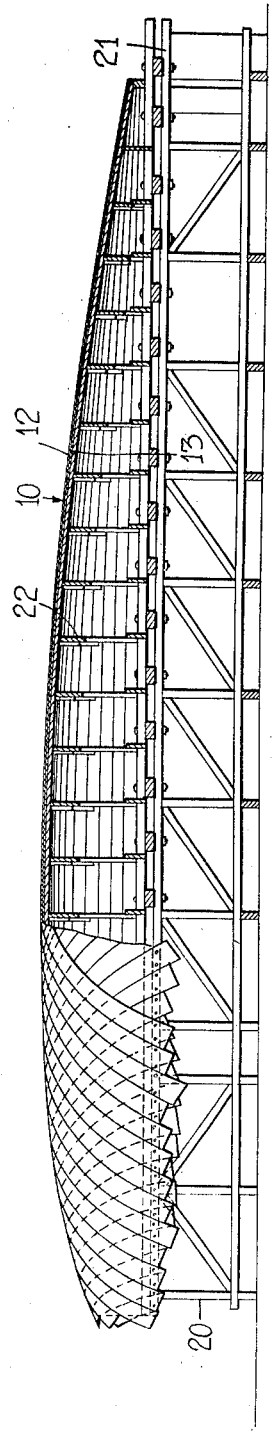
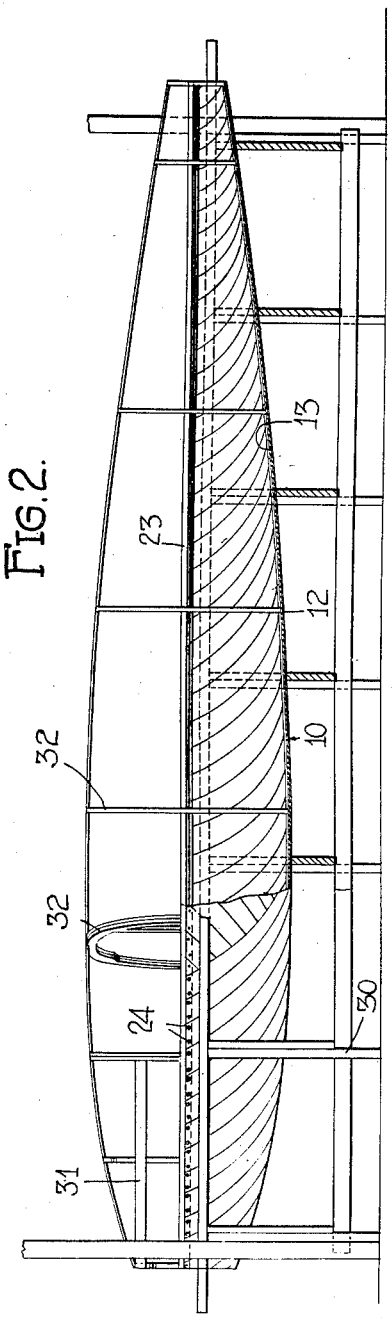
INVENTOR
WILLIAM L. GILMORE.
BY Chester H. Braselton
ATTORNEY W. L. GILMORE.
AIRPLANE FUSELAGE.
APPLICATION FILED JUNE 11, 1919.
1,368,428.
Patented Feb. 15, 1921.
2 SHEETS—SHEET 2.
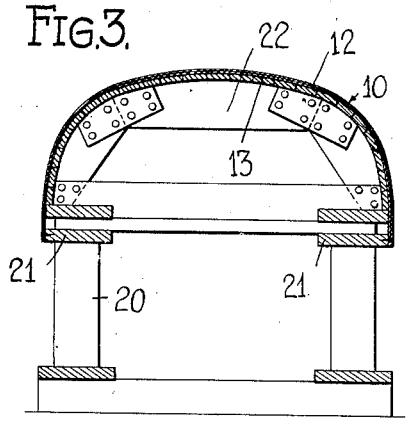
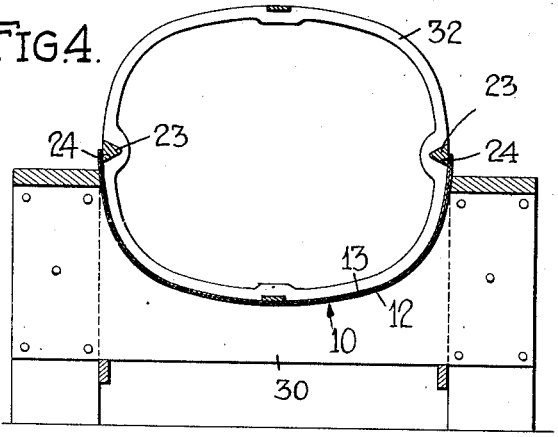
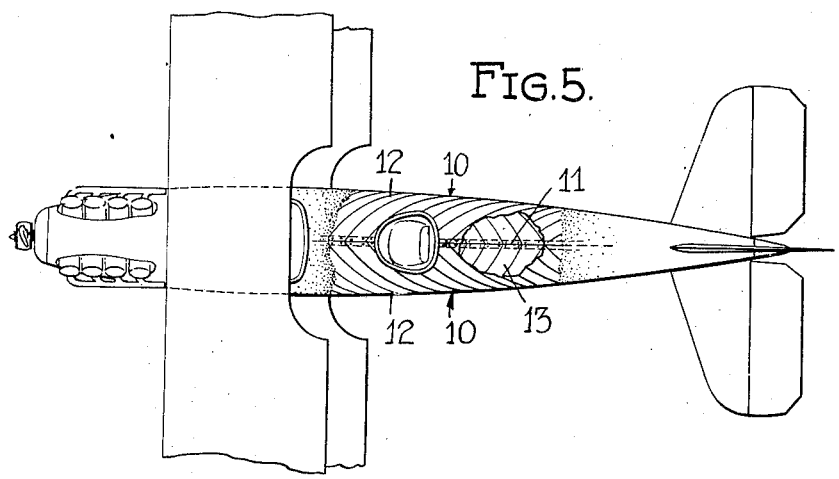
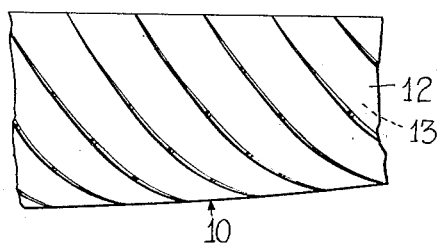
INVENTOR
WILLIAM L. GILMORE.
BY Chester H. Braselton
ATTORNEY

UNITED STATES PATENT OFFICE.

WILLIAM L. GILMORE, OF GARDEN CITY, NEW YORK, ASSIGNOR, BY MESNE ASSIGNMENTS, TO CURTISS AEROPLANE AND MOTOR CORPORATION, OF BUFFALO, NEW YORK, A CORPORATION OF NEW YORK.

AIRPLANE-FUSELAGE.

1,368,428.  Specification of Letters Patent.  Patented Feb. 15, 1921.

Application filed June 11, 1919. Serial No. 303,501.

*To all whom it may concern:*

Be it known that I, WILLIAM L. GILMORE, a citizen of the United States, residing at Garden City, in the county of Nassau and State of New York, have invented certain new and useful Improvements in Airplane-Fuselages, of which the following is a specification.

My invention relates to airplane bodies and more particularly to monocoque fuselages or nacelles.

In constructing monocoque bodies or shells it is the present practice, as distinguished from the invention herein disclosed, to construct the fuselage or nacelle of a plurality of layers of spirally laid strips of wood. These strips of wood are placed edge to edge and spiraled diagonally throughout the full circumference of the shell. To give the shell strength the strips of one layer are spiraled oppositely or at an angle to the strips of the other and between the oppositely spiraled layers a third or reinforcing layer of strips is interposed. The strips of the third or reinforcing layer extend longitudinally of the shell and constitute the means relied upon to prevent its axial distortion. In its manufacture the strips of the inner and outer layers are spiraled diagonally and continuously around a suitable core or filler and upon the completion of the shell the core or filler, which is preferably of the knock-down type, is removed or withdrawn in sections. Subsequent to its completion, and then only, can the installation of the interior fuselage equipment begin. Accordingly a fuselage thus characterized and constructed is exceedingly poor and extremely costly from a production point of view. Moreover, the shell is heavy and out of all proportions to its strength.

The present invention aims to and does overcome the above mentioned objectionable features. Instead of carrying the spirally laid strips of wood completely and continuously around the body a different arrangement is followed. The body or shell is preferably made in halves. The halves of the body are similarly constructed and when completed are arranged edge to edge with their open or concave sides adjacent. Each half or shell section comprises but two layers (an inner and an outer) of spirally laid strips, the strips constituting the respective layers being spiraled oppositely to each other. In addition to this the strips of both layers of one half or section are spiraled oppositely to the strips of the corresponding layers of the other section. It is this latter arrangement, *i. e.* the difference in the arrangement of the layer or layers of the longitudinally divided halves that I rely upon to eliminate the twisting moment set up in fuselages or nacelles wherein the strips constituting the shell or body are carried throughout the full circumference or completely around the fuselage or nacelle. By placing the longitudinal edges of the two halves in abutting engagement the twisting tendency of the one half is counter-acted by the opposite twisting tendency of the other. The use of a third or additional layer is unnecessary.

In the construction of the improved fuselage or nacelle a core or filler of a size and shape in cross section approximately the same as the size and shape in cross section of one half of the body, is provided. Upon the rounded surface of the core a series or plurality of strips are spirally laid, the ends of the strips being extended beyond the flat or non-working face of the core where they are temporarily fastened and held. This having been done a second series of strips is laid and fastened down upon the series of strips first mentioned. In laying said second series the strips are glued to the first mentioned layer of strips and extended diagonally in the opposite direction. The two series of strips together constitute a complete shell section or half. After drying and setting the shell section is removed by cutting (in a manner hereinafter more fully explained) and immediately upon its removal, or during its construction the second shell section or half is built over and around either the same or a similar core. The two shell sections or halves having been thus constructed they are fastened together to together constitute the finished or completed fuselage or nacelle.

In addition to the fuselage itself and the method of its construction the manner in which it is assembled is also new and novel.

In this connection I have provided a suitable jig or stand having a working face designed to receive one-half or a shell section of the body. Upon this jig or stand the half or shell section first constructed is placed with its open or concave side uppermost to admit of the subsequent installation of such interior fuselage equipment and structural elements as the frames, gas tank, motors, etc. During the installation of the interior equipment a large number of workmen may be simultaneously engaged in the work. Heretofore as intimated, the number of workmen thus engaged has been limited to one or possibly two (in the average size machine or fuselage) due to the fact that such work must be done after the shell is complete and hence entirely from the inside. In the latter case it also becomes necessary for the workman or workmen to carry on the work in a more or less cramped position. Upon the completion of the assembly of the interior equipment, and not until then is the remaining or second half or shell section fitted in place. In fitting it, the second shell section is placed over and upon the first mentioned shell section with its longitudinal edges in abutting engagement with the corresponding edges thereof. After trimming or cutting off the abutting edges to provide a perfect fit the two shell sections are fastened together and removed from the jig with the interior fuselage equipment completely assembled and intact.

In addition to the advantages above noted other advantages and improved results will be noted hereinafter. The scope of the invention will be found, however, upon reference to the appended claims.

Of the drawings, wherein like characters of reference designate like or corresponding parts:

Figure 1 is a view, partly in longitudinal vertical section and partly in side elevation, of the core or filler over which one or both sections of the monocoque shell are formed. In this view a portion of one of the sections is shown fastened to the jig upon and to which the core or filler is attached;

Fig. 2 is a similar view of the jig or stand upon which the finished half sections of the shell are assembled. In this view one of the half sections is shown resting on the stand with a portion of the interior equipment of the fuselage assembled;

Fig. 3 is a transverse vertical section of the construction jig and core. Here again a portion of one of the shell sections is shown;

Fig. 4 is a transverse vertical section of the assembly jig or stand. In this view, as in Fig. 2, one of the half sections and one of the elements of the interior fuselage equipment is shown;

Fig. 5 is a plan view of the fuselage as it appears in its relation to an airplane. In this view as in previous views, portions of the shell have been removed to better illustrate the manner in which the fuselage is constructed, and Fig. 6 is a detail fragmentary view illustrating a modified arrangement of the strips of wood constituting the respective shell sections or halves.

In the embodiment of the invention selected for illustration a fuselage of more or less conventional shape is disclosed. Being of the monocoque type it is characterized by an ovoidal cross section throughout substantially its full length. The shape of the fuselage however may be varied a great deal, for instance, in the practice of the invention it is not essential that the two halves of the fuselage or nacelle be identical in design nor is it essential, as hereinafter explained, to divide the fuselage in a vertical plane. It may equally as well be transversely divided although if divided vertically somewhat greater strength is obtained.

The halves of the fuselage (see Fig. 5) are designated as 10. Said halves abut longitudinally throughout the full length of the body as indicated at 11. They, the halves, are of identical construction and where the body is divided vertically the shape of the abutting halves is exactly the same. Each half comprises an inner and an outer layer of spirally laid strips of wood. The outer layer designated as 12 comprises strips of wood laid edge to edge and spiraled diagonally at an angle. The inner layer designated as 13, likewise comprises strips of wood laid edge to edge although the strips in this instance, while spiraled diagonally and at an angle, are spiraled oppositely or at substantially a right angle to the strips of the layer 12. The direction in which the strips of the respective layers are spiraled is immaterial, it being only essential that they be oppositely spiraled for increased strength. While the strips of the outer layer 12 of one shell section are spiraled at an angle to the strips of the inner layer 13 of the same shell section, the strips of the outer layer 12 of the one shell section are spiraled in the same direction as the strips of the inner layer 13 of the other or remaining shell section. In other words, the layers of strips constituting the outer shell sections are spiraled oppositely to each other as are the strips constituting the inner layers. In Fig. 5 of the drawings the relative arrangement of the strips of wood may be noted.

By extending the strips of the respective layers of one section at an angle to each other and by extending the strips of the corresponding layers of the opposed shell sections at an angle to each other maximum strength is obtained and all tendency to axial distortion is eliminated. The laying of the strips of the layers of one shell section at an angle to each other is instrumental in giving the required strength and the laying of the strips of the corresponding layers of the opposed shell section is instrumental in obviating or eliminating distortion. As explained hereinbefore, to carry these strips of the layers diagonally continuously around the fuselage or body, no matter whether the strips of the respective layers are spiraled oppositely or not, produces a strong tendency to twist the tapering end of the fuselage or body out of axial line. This tendency has only been overcome heretofore by the provision of a third or reenforcing layer of strips. The twisting tendency is due entirely to the continuity of the strips and not to the arrangement followed. Herein, on the other hand, the strips are discontinuous and the twisting tendency that might possibly be set up in one shell section, is counter-acted and completely off-set by the opposite twisting tendency set up in the abutting shell section.

Such fuselage construction is not only better because of the elimination of the twisting tendency but better aero-dynamically because of the reduction in weight. The use of a third or reinforcing layer is completely eliminated without a sacrifice of strength. The improved fuselage moreover involves a big saving of material since strips of wood heretofore considered scrap may be readily used. This is due to the fact that the strips are discontinuous and comparatively short rather than continuous and exceedingly long.

In the construction of the fuselage a construction jig 20 is provided. Along the top longitudinal edges of the jig side rails 21 are disposed. The outside faces of these rails offer a satisfactory surface to which the strips of wood constituting the respective shell sections are temporarily fastened. Upon the top of the jig 20 a suitable core or filler 22 is mounted. Said core or filler is fastened to the jig by any suitable means. Preferably the core or filler is adapted to the half only of the fuselage. The particular half is immaterial, it may be either right, left, upper or lower. As herein explained the fuselage is divided into right and left halves. Upon the rounded working face of the core or filler 22 the shell sections are built. In constructing them, the strips which afterward constitute the inner layer of strips, are laid diagonally over the core edge to edge. The edges may or may not abut. In Figs. 1 to 5 inclusive the edges are shown as abutting and in Figs. 6, (the modification) the edges abut only at the ends of the strips. To abut them requires an increased amount of labor since it is necessary, due to the tapering form of the core, to plane off the edges of adjacent strips whereas in the modification a wicker or latticed-work type of fuselage shell is produced. The ends of the strips after the edges thereof have been trimmed off as required are attached to the side rails 21 of the jig 20. In this way they are held in place temporarily. Upon the completion of the first layer, or even before its completion, the laying of the second layer may be started. In laying the second layer (afterward the outer layer) the strips are laid diagonally in the opposite direction to the strips of the first or inner layer. They too are carried beyond the flat or non-working face of the core to be temporarily fastened to the side rails 21 of the jig. Before laying the second layer, however, the outer face of the inner layer is given an application of glue or its equivalent. Upon hardening the glue holds the layers together. If desired, the strips of wood before their application may be bathed in glue including glycerin as an ingredient since this treatment of the wood tends to minimize the possibility of all fracture and splitting during their application. The glycerin in the glue softens the wood and eliminates subsequent warping.

After the two layers of strips are glued together and after the glue is properly set or congealed the complete shell section is removed from the core 22 by cutting it along lines at each side of the jig 20 intermediate the outside bottom edges of the core 22 and the outside top edges of the rails 21. The stubs or waste material of the strips which are still fastened to the rails 21 may be then removed to admit of the construction of a second shell section upon the same core.

It is not essential, however, that the same core be used in the erection of both halves of the shell. A similar or a different form of core may be used for the second half. Where the halves are symmetrical however, it is preferred that the one core be used since it is possible to proceed with the construction of the second half after the removal of the first half and during the assembly of the interior fuselage equipment within the first half in a manner hereinafter more fully explained.

Upon the completion of both halves or shell sections the two shell sections are fastened together with their concave sides adjacent. In fastening them together stringers 23 are provided. These stringers extend throughout the full length of the body upon the inside of the shell. The abutting edges of the shell sections are screwed to the stringers as indicated at 24. Before fastening the edges of the abutting shell sections together, however, they should be planed down in order that a perfect fit may be provided.

In the assembly of the fuselage a jig or stand 30 is provided. The top face of this jig is recessed or cut away to receive and snugly engage one of the completed shell sections or halves. The completed shell section or half is placed on the jig with its open side uppermost and is held in place by its snug engagement with the recessed top face of the jig. While in this position a substantial portion of the interior equipment of the fuselage is assembled. Such equipment includes an engine bed 31, suitable frames 32, a fuel tank (not shown) etc. Not only can such equipment be readily positioned within the half section of the fuselage when thus supported upon the jig but because of its accessibility such equipment can be finally and permanently fastened in place. Heretofore, as explained, the rapid assembly of the interior fuselage equipment in fuselages or nacelles of the monocoque type has been greatly impeded as a result of the inaccessibility of the fuselage interior. To assemble such equipment in the completed monocoque shell requires that the workman or workmen work from the inside and accordingly in a more or less cramped position. As a result of the improved method of assembly this objectionable feature is entirely overcome since substantially the greater portion of, if not all, of the interior equipment can be completely and finally assembled before the shell sections constituting the completed shell are fastened together. After the installation of the fuselage equipment the second shell section is fastened in place with its open side adjacent the open side of the shell section resting on the jig and with its longitudinal edges in firm abutting engagement with the corresponding edges of said first mentioned shell section or half.

If, as herein disclosed, the shell is divided vertically the shell sections, during the assembly of the body, are laid edge to edge and the interior fuselage equipment placed in the shell section directly supported by the jig, not in an upright position but in a position corresponding with the division line of the shell. If the shell is divided transversely, and this is entirely practical, the interior equipment may be assembled in an upright position. The reason, however, for dividing the shell vertically is that divided in this way greater strength is obtained.

It will be noted that in the assembly no core or filler is used. One of the shell sections merely rests upon a jig with its open side up and is not moved from this position until the fuselage is completed and the interior equipment finally installed. Another advantage obtained in consequence of the methods herein practised is the advantage derived through the saving of time. Obviously upon the completion of the first shell section, workmen other than those engaged in the construction of the second shell section may be immediately put to work installing the interior equipment without holding up or delaying the completion of the second section or half. Furthermore, even where but one construction jig is provided there is no let up or hold up in the work since the work resulting in the finished product may be continuously carried on.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What is claimed is:

1. A monocoque body for airplanes comprising an outer shell, the shell being made in sections, each section comprising a plurality of layers of spirally laid strips, the corresponding layers of strips constituting the respective sections being spiraled oppositely to each other.

2. A monocoque body for airplanes comprising an outer shell, the shell being made in sections, each section comprising separate layers of spirally laid strips, the corresponding layers of strips constituting the respective sections being spiraled oppositely to each other, and arranged to abut longitudinally of the body.

3. A monocoque body for airplanes comprising an outer shell, the shell being made in sections which abut longitudinally of the body, each section comprising a plurality of layers of spirally laid strips, the strips constituting the layers of the respective sections being spiraled oppositely to each other, and oppositely to the corresponding layers of the abutting sections.

4. A monocoque body for airplanes comprising an outer shell, the shell being made in halves, each half comprising a plurality of spirally laid strips, the strips of one half making a butt joint with and being spiraled oppositely to the strips constituting the other.

5. A monocoque body for airplanes comprising an outer shell, the shell being made in halves, each half comprising an inner and an outer layer of spirally laid strips, the strips of the respective halves being oppositely spiraled and the strips constituting the respective layers of one of the halves being spiraled oppositely to the strips constituting the corresponding layers of the other.

6. A monocoque body for airplanes comprising an outer shell, the shell being made in approximate halves with the longitudinal edges of the halves arranged to abut at diametrically opposite points, each half comprising a plurality of spirally laid strips, the strips of one half being spiraled oppositely to the strips constituting the other.

7. A monocoque body for airplanes comprising an outer shell, the shell being made in sections, each section comprising but two layers of spirally laid strips, the layers of the strips constituting the respective sections being spiraled oppositely to each other.

8. A monocoque body for airplanes comprising an outer shell, the shell being made in approximate halves, each half comprising but two layers of spirally laid strips, the strips of the respective halves being oppositely spiraled and the strips constituting the respective layers of one of the halves being spiraled oppositely to the strip constituting the corresponding layers of the other.

9. A monocoque body for airplanes comprising an outer shell, the shell being made in sections, each section comprising superimposed layers of spirally laid strips, the strips of the respective sections being oppositely spiraled and the strips constituting the respective layers of one of the sections being spiraled oppositely to the strips constituting the corresponding layers of the other section, the oppositely spiraled strips of the total number of sections which go to make up the body being arranged to abut longitudinally thereof whereby the twisting moment occasioned through the spiral arrangement of the strips of one section will be counteracted by the opposite twisting moment occasioned by the opposite spiral arrangement of the abutting section.

In testimony whereof I hereunto affix my signature.

WILLIAM L. GILMORE.